United States Patent

Cawse et al.

[11] Patent Number: 6,117,518
[45] Date of Patent: Sep. 12, 2000

[54] PARTICULATE REINFORCEMENT FOR HONEYCOMB CORE MATERIALS

[75] Inventors: John Leslie Cawse, Castle Camps; Graham Kemp, Linton; Terrence Charles Webb, Saffron Walden; George Edward Green, Stapleford, all of United Kingdom

[73] Assignee: Hexcel Corporation, Pleasanton, Calif.

[21] Appl. No.: 08/897,198

[22] Filed: Jul. 21, 1997

[30] Foreign Application Priority Data

Jul. 22, 1996 [EP] European Pat. Off. .............. 96305347

[51] Int. Cl.⁷ ...................................................... B32B 3/12
[52] U.S. Cl. ............................. 428/116; 428/73; 428/118; 428/327
[58] Field of Search ..................... 428/116, 118, 428/73, 327

[56] References Cited

U.S. PATENT DOCUMENTS

| | | | |
|---|---|---|---|
| 4,863,787 | 9/1989 | Gawin ....................................... | 428/240 |
| 5,028,478 | 7/1991 | Odagiri et al. ........................... | 428/283 |
| 5,116,635 | 5/1992 | Rudbach et al. ............................. | 427/8 |
| 5,151,311 | 9/1992 | Parente et al. ........................... | 428/116 |
| 5,169,710 | 12/1992 | Qureshi et al. .......................... | 428/246 |
| 5,279,893 | 1/1994 | Hattori et al. ........................... | 428/298 |
| 5,413,847 | 5/1995 | Kishi et al. .............................. | 428/283 |
| 5,543,212 | 8/1996 | Oosedo et al. ........................... | 428/229 |
| 5,605,745 | 2/1997 | Recker et al. ........................... | 442/175 |
| 5,627,222 | 5/1997 | Recker et al. ........................... | 523/400 |

FOREIGN PATENT DOCUMENTS

| | | |
|---|---|---|
| 40 03 249 A1 | 8/1991 | Germany . |
| 131309 | 6/1785 | Japan . |
| 86898 | 7/1973 | Japan . |
| 824 | 1/1987 | Japan . |
| 333157 | 12/1989 | Japan . |
| 180504 | 6/1991 | Japan . |

OTHER PUBLICATIONS

Japanese Unexamined Patent Publication No. Pyung 7–60876 (Mar. 7, 1995) European Search Report.

*Primary Examiner*—Timothy M. Speer
*Attorney, Agent, or Firm*—Oppenheimer Wolff & Donnelly LLP

[57] ABSTRACT

An improved honeycomb structure formed from a nonwoven sheet material coated with a resin which contains particles of a polymeric material. The inclusion of solid polymeric particles in the resin coating was found to increase the strength and stiffness of the honeycomb without degrading compressive properties. Composite panels are also disclosed where the improved honeycomb structure is combined with one or more facing sheets.

23 Claims, 1 Drawing Sheet

6,117,518

PARTICULATE REINFORCEMENT FOR HONEYCOMB CORE MATERIALS

BACKGROUND OF THE INVENTION

1. Field of the Invention

The present invention relates generally to honeycomb materials which are used widely as the core in composite panels. More particularly, the present invention relates to the resins which are used to coat the honeycomb material to increase the strength of the core.

2. Description of Related Art

Honeycomb core for composite panel applications is typically prepared from sheets of a suitable material, bonded together at controlled intervals and then expanded to form hexagonal cells. The expanded material is then cut into suitable thicknesses to produce slices which can be used as the central region of a composite panel. Commonly, the material from which such honeycomb is produced can be a non-woven paper-like sheet formed from cellulose, for example a Kraft paper, or other commonly used fibers such as high density polyethylene or other synthetic fibers. Additional materials used to make non-woven paper-like sheet include fiberglass, carbon, quartz and ceramic fibers or combinations thereof. A commonly encountered non-woven material for producing such honeycombs is based on Nomex, an aramid fibre (a poly[m-phenylene isophthalamide]) produced by E. I. duPont de Nemours (Wilmington, Del.) and supplied for purposes of honeycomb manufacture in the form of a paper-like material. Also similar are honeycombs based on mixtures of Nomex fibre and a second fibre, namely poly[p-phenylene terephthalamide], known variously as Kevlar (product of DuPont) or Twaron (product of Akzo Chemie, Wuppertal, Germany). However, whilst Nomex and the other paper-like materials are suitable basic components for honeycomb production, they do not in themselves possess sufficient strength to enable the production of strong composite panels and it is therefore common practice to coat the honeycomb with a thermosetting resin. The resin coated core may then be bonded to suitable outer skins, such as carbon or glass pre-pregs or laminates, and cured to form useful structurally strong panels. Many applications of composite panels in the aircraft industry and the like require that such panels have high strength and stiffness but are very light in weight.

Although it is possible to achieve small changes in the mechanical properties of the honeycomb by methods well known to those skilled in the art, for example by the use of alternative solvents, different cure schedules and so on, these methods generally lead to the degradation of one property at the expense of another. Typically, an improvement in the shear strength of the coated core is achieved only at the expense of a decrease in the compression strength. The reason for this effect is not fully understood, but is believed to be related to the tendency of the coating resin to deposit preferentially at either the corners or the flat portions of the honeycomb cells, modifying the compressive or shear properties respectively.

In view of the above, there is a continuing need to develop new resin coatings which can be used to strengthen honeycomb core materials. The new resin formulation must be capable of uniformly increasing strength of the honeycomb core without causing reductions in other important mechanical properties of the material.

SUMMARY OF THE INVENTION

In accordance with the present invention, honeycomb structures are provided which are well-suited for use as core materials in composite panels. It was discovered that the incorporation of insoluble polymeric particles into the resin used to coat honeycomb structures increases the strength, and surprisingly, the stiffness of the honeycomb. These improvements are achieved without a significant degradation in the compressive properties of the core, and without an increase in weight.

The present invention provides a honeycomb structure which includes a plurality of interconnected walls having surfaces which define a plurality of honeycomb cells. The surfaces of the honeycomb cells are coated with a resin which contains particles of polymeric material. The polymeric particles are made from thermoset and/or thermoplastic materials. Mixtures of these two types of plastic materials are contemplated within the scope of the present invention. However, the use of linear or partially cross-linked thermoset polymeric particles alone is preferred. The polymeric particles are mixed in with the resin coating in amounts ranging from 0.1 to 60%. The particle size of the polymeric particles ranges from 0.1 to 100 $\mu$m.

The honeycomb structures in accordance in the present invention include a plurality of honeycomb cells which have first edges and second edges that define first and second exterior sides of said honeycomb structure. As a feature of the present invention, at least one sheet of exterior siding is attached to at least one of the exterior sides of the honeycomb structure to form a structural panel. In addition, structural panels are provided wherein the improved honeycomb core is sandwiched between two exterior sides.

The increased structural strength provided by the honeycomb structures of the present invention make them especially well-suited for use in a wide variety of applications where high strength and light weight are required. The above features and many other attendant advantages of the present invention will become better understood by reference to the following detailed description when taken in conjunction with the accompanying drawings.

DETAILED DESCRIPTION OF THE INVENTION

Figure 1:
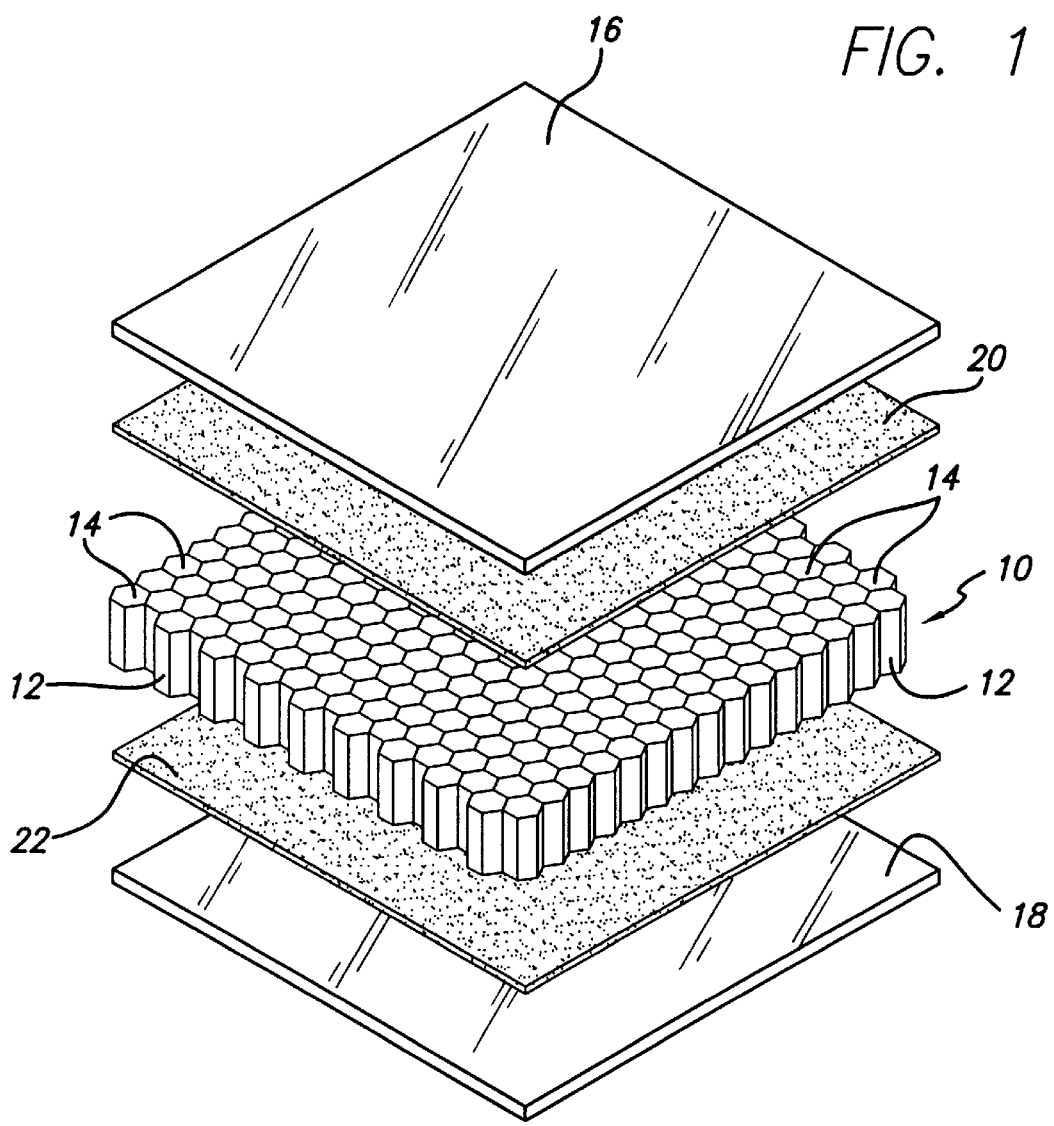
FIG. 1 is an exploded view of a structural panel in accordance with the present invention showing the honeycomb core, two sheets of siding and the adhesive used to bond the core and siding together to form a sandwich panel.
Figure 2:
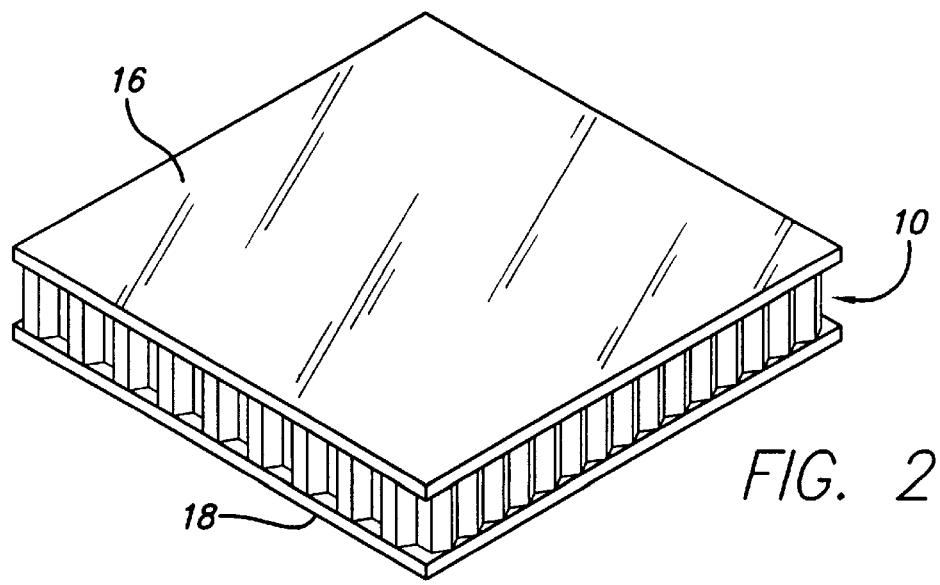
FIG. 2 is a perspective view of an exemplary structural panel which includes a honeycomb core in accordance with the present invention.

An exemplary honeycomb structure in accordance with the present invention is shown at 10 in FIGS. 1 and 2. The honeycomb structure 10 includes a plurality of interconnected walls 12 which have surfaces that define a plurality of honeycomb cells 14. In accordance with the present invention, a coating is applied to cover the surfaces of the honeycomb structure 10 in order to enhance the structural strength of the structure. The coating is a resin which includes solid particles of polymeric material.

The honeycomb core walls may be made from any of the materials conventionally used to form honeycomb cores. Exemplary materials include any of the various non-woven paper-like sheet formed from cellulose (Kraft paper) or other commonly used fibers such as high-density polyethylene, fiberglass, carbon fibers, quartz fibers, ceramic fibers, boron fibers or combinations thereof. Exemplary non-woven sheet materials are available under the tradenames NOMEX, KEVLAR and TWARON. The present invention has wide application to reinforcing the structural strength of honeycomb core materials made from the exemplary materials and any other of the conventional materials used to fabricate honeycomb cores.

The amount of resin coating which is applied to the honeycomb walls will vary depending upon a number of factors. For example, non-woven materials which are relatively porous, will require more resin in order to achieve adequate wetting of the honeycomb walls. Preferably, the honeycomb walls will be treated with sufficient resin to saturate the non-woven paper-like material. For relatively non-porous core materials, it is preferred that a sufficient amount of resin be applied to the material to provide coating thicknesses on the order of 0.1 to 5 mils.

The base resin used for coating of the honeycomb is preferably a thermosetting resin such as phenol-formaldehyde, epoxy, cyanate ester, bis-maleimide, unsaturated polyester, or similar resins well known in the art. Preferably, the resin is a phenol formaldehyde resin and may be a resole or a novolak resin. Other aldehydes, for example furfuraldehyde, may be used, and other phenols for example hydroquinone and p-cresol may also be used. The preparation of p-cresol and properties of such resins are described in "Phenolic Resins," authors A. Knop and L. A. Pilato, Springer-Verlag, Berlin, 1985. A resole resin is cured simply by the application of heat whereas a novolak resin requires for its cure the additional presence of a formaldehyde generating substance, for example hexamethylenetetramine, also known as hexamine. Resole type resins are preferred.

The resins may be used as solutions or dispersions in solvents or dispersion media, for example water, acetone, propan-2-ol, butanone, ethyl acetate, ethanol, and toluene. Mixtures of these solvents may be used to achieve acceptable evaporation rates of the solvent from the honeycomb core. The amount of solvent used will vary widely depending upon a number of factors including the type of honeycomb material being used. In general, the solvents should be added in conventional amounts to provide a resin solution which, after addition of the polymeric particles, may be easily applied to the honeycomb core in accordance with known processes.

The polymeric particles which are added to the basic resin coating in accordance with the present invention may be selected from a wide variety of thermosetting and/or thermoplastic polymers. Exemplary polymer materials include polyolefin, polyamide, polyimide, polyamide-imide, polyetherimide, polyester, polysulphone, polyarylenesulphide, polyethersulphone, polycarbonate, polyketone and polyetheretherketone. Particularly suitable are the polymers known as high performance thermoplastics, which generally are polymers with high temperature stability and very good mechanical properties, in particular strength and stiffness. In addition, thermosetting polymer particles may be used which may be selected from the well-known classes of polymer materials such as epoxy, cyanate esters and bis-maleimides.

The particles of the polymers suitable for the process of this invention may be prepared by emulsion polymerization, suspension polymerization, dispersion polymerization, or by grinding up or otherwise comminuting particles which have been formed by other polymerization techniques, for example bulk or solution polymerization.

The particles of the above polymer groups are normally insoluble in the above mentioned solvents of the coating medium at room temperature, but the particles may additionally be rendered insoluble during manufacture by lightly crosslinking the polymer from which the particles are prepared. The crosslinking may be achieved by incorporating a polyfunctional crosslinking agent in the polymerization formulation when the particles are prepared, or the particles may be subsequently crosslinked after polymerization, for example by exposure of the particles to gamma irradiation or heat.

The size of the particles used in this invention are within the range 0.1 to 100 $\mu$m, preferably 1 to 50 $\mu$m. The amount of polymeric particles may be from 0.1% to 60% preferably from 1% to 30% by volume of the coating resin. The particles are incorporated into the coating by simply mixing them into the resin/solvent mixture. It is preferred that the coating mixture be stirred prior to application to insure that the particles are uniformly distributed throughout the resin.

As shown in FIGS. 1 and 2, the honeycomb core 10 of the invention may be used in the manufacture of composite panels by bonding facing sheets or siding 16 and 18 to the exterior sides of the core. Facing sheets may be of a resin-impregnated fiber, such as glass, polyamide or carbon fiber, or of a metal such as stainless steel or aluminum.

The bonding may be effected using an adhesive, as shown at 20 and 22, which may be a thermoplastics material, or preferably, a thermosetting resin such as a polyepoxide, polyurethane, or phenolic resin or a mixture of a thermosetting resin and a thermoplastic material. The procedures and processes for bonding the facing sheets to the honeycomb core are known in the art.

The term "honeycomb core" as used in this specification includes cores having square, sinusoidal, rectangular, reinforced hexagonal, cylindrical, or hexagonal cells. So-called auxetic or shapable cores are also included. Cores having hexagonal cells are preferred.

In each of the examples which follow, the results quoted are the mean of several samples of similar density (i.e. within 3 kgm$^{-3}$ of the target density).

EXAMPLE 1

A phenol-formaldehyde resole with a molar ratio of 0.67 P/F is used as the basic coating for the honeycomb. The resin is applied from acetone solution, and the solution is adjusted to give a viscosity of 25 cps using a Brookfield viscometer with spindle No. 1 and 20 rpm spindle speed. Slices of raw hexagonal cell honeycomb, 3 mm cell size and 3 mil paper thickness, are dipped into the solution and excess resin solution removed by a compressed air purge. The acetone solvent is then removed by placing the dipped slices in an oven at 80° C. for 30 minutes. The cure schedule is 140° C. for 10 minutes followed by 160° C. for 50 minutes.

A dispersion of polyamide copolymer particles (Orgasol 3202 D Nat 1, ex Elf Atochem) is prepared by stirring 36.43 g of particles with 703.2 g of the above resin thereby providing a dispersion containing 10% of particles by volume of the dry resin. The dispersion is kept gently agitated during dipping to prevent sedimentation of the particles.

Nomex honeycomb slices are coated with one, two or three coats of the resin dispersion to provide coated core samples of three different densities. To provide comparative data, samples of Nomex core are coated as in the above procedure except that no thermoplastic particles are added to the coating resin. The coated samples are tested in compression, plate shear and short beam shear modes. Compression tests are carried out on samples 76 mm square and 10 mm thick. An Instron 4483 test machine is operated at a crosshead speed of 0.5 mm/minute. Plate shear tests (Example 2) are carried out on specimens 150 mm long×50 mm wide×12.7 mm thick. The core is bonded to steel plates (215×50×12.7 mm) using Redux 312 film adhesive (product of Hexcel Composites, Duxford, England) cured at 120° C. and 70 kPa pressure. The test is performed at a crosshead speed of 0.075 mm/minute. Short beam shear tests are carried out on samples of core with dimensions 150×76.2× 10 mm. The specimens are laid up as a sandwich structure as follows:

Outer skins: Unidirectional R-glass reinforced epoxy pre-preg, 27% resin, fibre orientation perpendicular to long axis of test specimen;
Inner skins: Core adhesive pre-preg comprising an upper layer of unidirectional R-glass epoxy pre-preg as above, with the fibre orientation parallel to the long axis of the test specimen, and a lower layer of an epoxy adhesive to give an overall resin content of 41%;
Core: Coated honeycomb samples prepared as above. Ribbon direction perpendicular to long axis of test specimen.

The specimens are cured at 140° C. for 50 minutes at 345 kPa. The test is carried out using 3-point bending geometry with uniform loading across the center of the upper surface, and the lower centers are separated by 101.6 mm. Load spreaders 25 mm in width are used at each of the three points. The crosshead speed is 2.54 mm/minute.

| Density, | Compression Strength, MPa | | Short Beam Shear Strength, MPa | |
|---|---|---|---|---|
| Kg m$^{-3}$ | No Additive | 10% Additive | No Additive | 10% Additive |
| 103 | | | 1999 | 2327 |
| 140 | 8.6 | | | |
| 141 | | 8.5 | | |
| 157 | 11.1 | | | |
| 152 | | 10.9 | | |
| 157 | | | 2900 | 3884 |

This example clearly demonstrates that the use of the polyamide particulate dispersion as a coating for Nomex core gives substantially improved short beam shear strength with little or no reduction in compression strength.

EXAMPLE 2

Dispersions of the thermoplastic polyamide particulate material Orgasol 1002 D NAT 1 (Product of Elf Atochem) are prepared as in Example 1 so as to provide final volume fractions of Orgasol within the cured resin coating of 5% and 10%. The core samples are coated as in Example 1. In addition to compression test pieces, specimens are produced for testing in the plate shear mode as follows:

Properties of the Core in Compression Testing

| Mean Density, kgm$^{-3}$ | Strength, MPa | | |
|---|---|---|---|
| | No Additive | 5% Vol/Vol | 10% Vol/Vol |
| 88 | 4.4 | — | 4.1 |
| 111 | 6.5 | — | |
| 113 | | — | 6.6 |
| 149 | 9.9 | 9.8 | — |
| 157 | 11.1 | — | |
| 160 | | — | 11.7 |

Properties of the Core in Plate Shear Mode Testing

| Mean Density, kgm$^{-3}$ | Modulus, MPa | | | Strength, MPa | | |
|---|---|---|---|---|---|---|
| | Percentage of Additive by Volume | | | | | |
| | 0% | 5% | 10% | 0% | 5% | 10% |
| 81 | 70 | — | 91 | 2.26 | — | 2.46 |
| 109 | 90 | — | 103 | 2.7 | — | 2.98 |
| 139 | 107 | 141 | — | — | 3.42 | — |
| 141 | 109 | — | 115 | 3.1 | — | 3.54 |

As can be seen from the above results, the presence of the polymeric particulate additive not only increases the plate shear strength above that of the control containing no additive, but very surprisingly the modulus is also increased. The compression strength remains essentially unaltered by the addition of the polymeric particulate additive.

EXAMPLE 3

A dispersion of 45.5 g of poly(ether ether ketone) (PEEK) particles, (Victrex PEEK 150XF, product of PK Plastics Ltd., Huntingdon, England; mean particle size 25 μm; prepared by grinding larger particles of PEEK) in 733.9 g of resin described in Example 1 is prepared. This gives a dispersion containing 10 percent weight of the fine PEEK particles. This particulate dispersion is used to coat the Nomex core in the same way as Example 1, providing samples with final density of 165±2 kgm$^{-3}$.

| Density, | Compression Strength, MPa | | Short Beam Shear Strength, MPa | |
|---|---|---|---|---|
| Kg m$^{-3}$ | No Additive | 10% PEEK | No Additive | 10% PEEK |
| 164 | 12.3 | | | |
| 163 | | 12.2 | | |
| 167 | | | 3096 | 3520 |

This example demonstrates that improved short beam strength may be obtained with no significant change in compressive strength using a thermoplastic particulate additive, in the resin used for coating the core.

Examples 1 to 3 demonstrate that the addition of a polymeric particulate material to the coating resin of a honeycomb core results in significant improvements of the shear properties of the core with no decrease in the compressive properties.

EXAMPLE 4

In this example, there is added to the dip resin a mixture of two different thermoplastic polymeric particles. The total volume percentage of polymer particles is 10% based on dry resin.

Thus, to 780 g of the phenol-formaldehyde resole of Example 1 there is added 25.57 g each of Orgasol 3202 (a nylon copolymer particle made by AtoChem) and Orgasol 1009 EX DNAT 1 (a crosslinked nylon 12 particle made by AtoChem). These particles have mean particle sizes of approximately 10–20 $\mu$m according to manufacturer's data. This resin mixture is then used for coating Nomex core as in Example 1. The following results are obtained for compression and shear properties.

| Density | Compression Strength, MPa | | Short Beam Shear Strength, MPa | |
|---|---|---|---|---|
| Kg m$^{-3}$ | No Additive | 10% Additive | No Additive | 10% Additive |
| 87 | 4.3 | 3.9 | — | — |
| 118 | — | — | 2212 | 2482 |
| 120 | 7.2 | 7.2 | — | — |
| 146 | — | 9.5 | — | — |
| 149 | 9.9 | — | — | — |
| 183 | 13 | — | 3135 | 3675 |

The above results show that the addition of two different thermoplastic polymeric particles brings about an improvement in shear strength while leaving the compression strength substantially unaltered.

EXAMPLE 5

In this example, the polymer particles which are added to the dip resin are thermosetting. Thus, to 567 g of the phenol-formaldehyde resole in Example 1 are added 35.25 g of ground epoxy resin powder, mean particle size 45 microns. The epoxy resin is a reaction product of the tetraglycidyl derivations of 4,4'-diaminophenol methane and 3,3'-diethyl-4,4'-diaminophenyl methane and the trigylcidyl derivative of 4-aminophenol, with 3,3'-diamino diphenyl sulphone. The dip resin containing these thermosetting polymer particles is then used to coat Nomex core as in Example 1. The following results are obtained for compression and shear properties.

| Density | Compression Strength, MPa | | Short Beam Shear Strength, MPa | |
|---|---|---|---|---|
| Kg m$^{-3}$ | No Additive | 10% Additive | No Additive | 10% Additive |
| 96 | 4.8 | 4.8 | — | — |
| 134 | 8.5 | 8.8 | — | — |
| 140 | — | — | 2540 | 2875 |
| 157 | 11.1 | 11.4 | — | — |
| 166 | — | — | 3096 | — |
| 167 | — | — | — | 3795 |

The above results show that the addition of a thermosetting particulate polymer to the honeycomb coating resin brings about an improvement in shear strength while leaving the compression strength substantially unaltered.

EXAMPLE 6

In this example, the polymer particles which are added to the dip resin cmoprise a mixture of a thermosetting particulate polymer and a thermoplastic particulate polymer. The total volume of particulate material is 10% on the basis of total resin solids. Equal volumes of each particulate material are added to the dipping resin. Thus, 19.34 g of Orgasol 3202 and 21.27 g of the epoxy resin particles of Example B are added to 622 g of the phenol-formaldehyde resole of Example 1. This dip resin mixture is then used for coating Nomex core as in Example 1. The following results are obtained for compression and shear properties.

| Density | Compression Strength, MPa | | Short Beam Shear Strength, MPa | |
|---|---|---|---|---|
| Kg m$^{-3}$ | No Additive | 10% Additive | No Additive | 10% Additive |
| 88 | 4.4 | 4.3 | — | — |
| 89 | — | — | 1700 | 1857 |
| 127 | 7.7 | 7.5 | 2365 | 2842 |
| 160 | — | 12.8 | — | — |
| 164 | 12.3 | — | — | — |
| 167 | — | — | 3096 | — |
| 168 | — | — | — | 3845 |

The above results show that the addition of polymeric particles comprising a mixture of thermosetting and thermoplastic particles to a honeycomb core dipping resin gives rise to significantly improved shear strength while having no substnatial effect on the compressive strength of the core.

Having thus described exemplary embodiments of the present invention, it should be noted by those skilled in the art that the disclosures herein are exemplary only and that various other alternations, adaptations and modifications may be made within the scope of the present invention. Accordingly, the present invention is not limited to the specific embodiments as illustrated herein.

What is claimed is:

1. A honeycomb structure comprising:
   a plurality of interconnected walls having surfaces which define a plurality of honeycomb cells, wherein said plurality of honeycomb cells form a honeycomb structure; and
   a coating covering at least a portion of said surfaces, said coating comprising a resin which contains particles of polymeric material.

2. A honeycomb structure according to claim 1 wherein said polymeric particles comprise particles selected from the group consisting of thermoset and thermoplastic particles.

3. A honeycomb structure according to claim 2, wherein said polymeric particles comprise a mixture of thermoset and thermoplastic particles.

4. A honeycomb structure according to claim 2, wherein said polymeric particles consist essentially of linear or partially cross-linked thermoset polymeric particles.

5. A honeycomb structure according to claim 2, wherein said thermoplastic particles are selected from the group of polymeric materials consisting of polyolefin, polyamide, polyimide, polyamide-imide, polyetherimide, polyester, polyarylenesulphide, polysulphone, polyethersulphone, polycarbonate, polyketone and polyetheretherketone.

6. A honeycomb structure according to claim 5, wherein said polymeric particles consist essentially of polyamide-imide particles.

7. A honeycomb structure according to claim 1, wherein said resin consists essentially of a thermosetting resin.

8. A honeycomb structure according to claim 7, wherein said thermosetting resin is selected from the group of resins consisting of phenol-formaldehyde, epoxy, cyanate ester, bis-maleimide and unsaturated polyester.

9. A honeycomb structure according to claim 1, wherein said walls comprise a non-woven fiber material.

10. A honeycomb structure according to claim 9, wherein said non-woven fiber material comprises fibers selected from the group consisting of glass fibers, carbon fibers, quartz fibers, aramid fibers, cellulose fibers, high density polyethylene fibers, ceramic fibers, boron fibers and combinations thereof.

11. A honeycomb structure according to claim 1, wherein said polymeric particles have a particle size from 0.1 to 100 μm.

12. A honeycomb structure according to claim 1, wherein the amount of particles of polymeric material in said coating is from 1% to 60% by weight of said coating.

13. A structural panel comprising:
  a honeycomb structure according to any one of the preceding claims, wherein said plurality of honeycomb cells have first edges and second edges which define first and second exterior sides of said honeycomb structure; and
  at least one sheet of exterior siding attached to at least one of said exterior sides of said honeycomb structure to form said structural panel.

14. A structural panel according to claim 13, wherein said panel comprises:
  a first sheet of exterior siding attached to said first exterior surface of said honeycomb structure; and
  a second sheet of exterior siding attached to said second exterior surface of said honeycomb structure.

15. A structural panel according to claim 13, wherein said sheet of exterior siding is made from resin impregnated fiber or metal.

16. In a honeycomb structure which comprises a plurality of interconnected walls having surfaces which define a plurality of honeycomb cells and wherein at least a portion of said surfaces are covered with a resin coating, the improvement comprising including in said resin coating from 1 to 60% by weight of particles wherein said particles consist essentially of polymeric material.

17. An improved honeycomb structure according to claim 16 wherein said polymeric particles have a particle side of from 0.1 to 100 μm.

18. An improved honeycomb structure according to claim 16, wherein said polymeric particles comprise particles selected from the group consisting of thermoset and thermoplastic particles.

19. An improved honeycomb structure according to claim 18, wherein said polymeric particles comprise a mixture of thermoset and thermoplastic particles.

20. An improved honeycomb structure according to claim 18, wherein said polymeric particles consist essentially of linear or partially cross-linked thermoset polymeric particles.

21. An improved honeycomb structure according to claim 18, wherein said thermoplastic particles are selected from the group of polymeric materials consisting of polyolefin, polyamide, polyimide, polyamide-imide, polyetherimide, polyester, polyarylenesulphide, polysulphone, polyethersulphone, polycarbonate, polyketone and polyetheretherketone.

22. An improved honeycomb structure according to claim 16, wherein said polymeric particles are made by emulsion polymerization, suspension polymerization or dispersion polymerization.

23. An improved honeycomb structure according to claim 16, wherein said polymeric particles are made by grinding or otherwise comminuting larger particles to form said polymeric particles.

* * * * *